Dec. 18, 1934.  A. D. MacLEAN  1,984,592
PRESSURE REGULATOR FOR GAS REFRIGERATOR PILOT LIGHTS
Filed Dec. 6, 1930
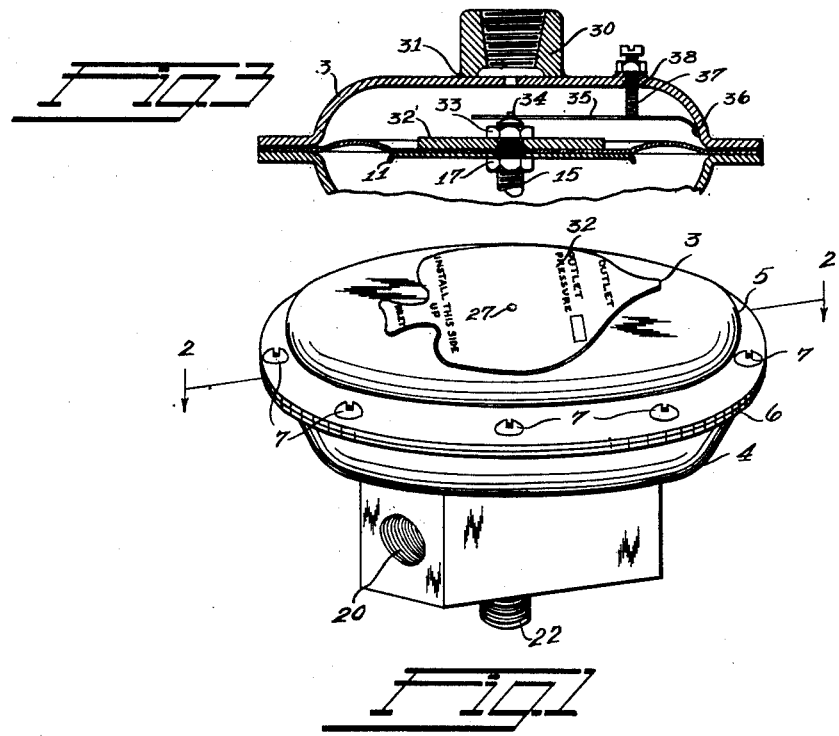
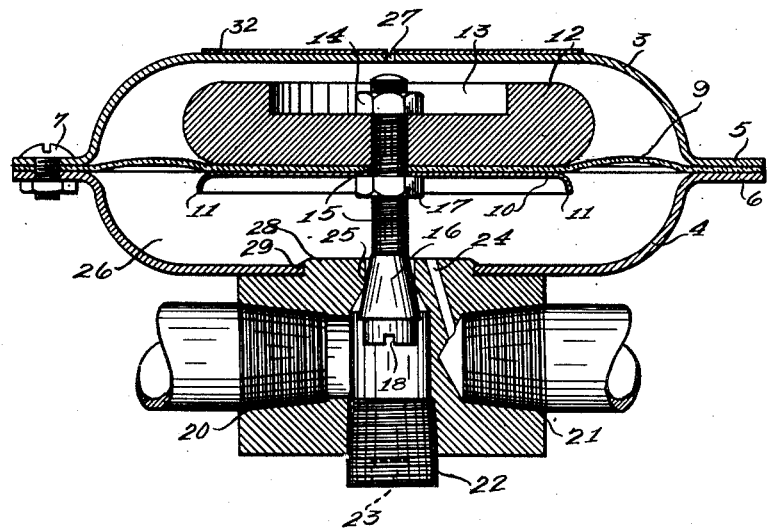
Inventor
Allen D. MacLean Patented Dec. 18, 1934

1,984,592

UNITED STATES PATENT OFFICE 1,984,592

PRESSURE REGULATOR FOR GAS REFRIGERATOR PILOT LIGHTS

Allen D. MacLean, Pittsburgh, Pa., assignor to Pittsburgh Equitable Meter Company, Pittsburgh, Pa., a corporation of Pennsylvania Application December 6, 1930, Serial No. 500,636

3 Claims. (Cl. 50—24)

The present invention relates to a gas pressure regulator of the type particularly adapted for use in regulating the pressure of the gas supplied to the pilot light of a gas refrigerator, although it is not limited in any way to that sole use.

Various pressure regulators have been developed for the different conditions and constructions requiring the pressure regulation of a fluid, but all of the preceding constructions have been expensive and cumbersom. In addition they have presented the disadvantage of not being readily assembled or disassembled. For use in gas refrigerators a fluid regulator that is of a simple and cheap construction is absolutely essential. In order that gas refrigeration may compete in price in a competitive market with electrical refrigeration, the cost of a single element, as, for example, the pressure regulator, if allowed to become large, might greatly and unnecessarily increase the cost of the refrigerator and decrease its chances in the price competition.

Another element which must be considered is labor cost in the assembling of a pressure regulator. This, too, must be kept to an absolute minimum in order for gas refrigeration to be considered by a prospective purchaser in a market in which cost is the determining factor. Moreover, ease of disassembly is of the utmost importance because ordinarily when a gas refrigerator gets out of working order and a repairman is sent out from the central office or plant to repair it, it is important that elaborate and numerous tools be unnecessary. Ordinarily disassembly should be capable of being accomplished with the minimum number of the simplest kind of tools since an expensive repair kit cannot be carried by the traveling refrigerator repairman.

Still another requirement for such a pressure regulator as used on the pilot light of a gas refrigerator is a durable and sturdy construction. Ordinarily little, if any, attention is paid to such an element by the user and ordinarily the regulator is in a relatively exposed position subject to abuse and the deterioration caused by weather conditions. If the construction were not durable, the life of the regulator would be short and the replacement expense large and unbearable.

I have constructed a pressure regulator for fluids which is particularly adapted, though not necessarily limited in its use, to gas refrigeration, and which fulfills all the above outlined requirements for pilot light regulators. The construction is simple and inexpensive, only standard simple elements being required and only the simplest of manufacturing processes being used in the construction of the element. This is a distinct and valuable step in making my pilot light pressure regulator inexpensive and therefore desirable, since standard stock elements are used and the inexpensive metal parts used are formed by stamping, turning, boring, and casting, all operations requiring only the usual machine shop machinery and no special expensive tools or machines being necessary. The valve and stem assembly is formed on an ordinary screw machine turning out large quantities of such elements, and the leather diaphragm is made of a thin and inexpensive oiled sheepskin.

I believe that I have reduced the problem of assembly and disassembly to the absolute minimum, since the only tools required for either process are an ordinary screw driver and wrench. Such tools are found anywhere and need not necessarily be carried by the repairman. Moreover, when the pilot regulator becomes clogged or out of order, the user may himself be able to remove the casing and clean out the operative parts because he usually has these simple tools.

The herein disclosed construction is one of unusual durability and strength, because the exterior parts consist of a pressed steel casing, bowed outwardly, which lends strength to the regulator, and a solid block of drilled steel. Interiorly, there is a solid substantial weight of a non-corrosive, non-rusting metal such as lead and an ordinary headed machine screw, which may be designed of sufficient strength.

In prior regulator constructions in which cast metal parts have been generally used to form the casing it has been customary to cast directly into the casing indications of the outlet and inlet connections, the name of the maker, outlet pressures, installation instructions and like information. The cost of stamping or embossing such indications and information on my improved steel regulator is prohibitive in practice, and a further object of the present invention therefor is to provide a novel method and means for indicating the inlet and outlet connections, outlet pressure of the regulator, applying the manufacturer's name, pertinent patent numbers and other desirable information, and in addition to serve as a shipping tag thereby eliminating the cost of tying a separate shipping tag to each regulator as is necessary with the prior constructions.

Further objects of my invention will be readily apparent from the following detailed description of a preferred embodiment as shown in the drawing filed herewith and as defined by the scope of the appended claims. The herein described embodiment is intended to be illustrative rather than limiting and equivalents are intended to be covered by the claims.

In the drawing:

Figure 1 is a perspective view of the fluid pressure regulator, showing the exterior pressed steel casing and the bored steel block welded thereto.

Figure 2 is a vertical section taken on line 2—2 of Figure 1, looking in the direction of the arrows.

Figure 3 is a cross-section of a modified form of the upper pressed steel casing member.

The diaphragm chamber of the regulator is formed of two pressed steel, dished discs 3 and 4 bolted together at flanges 5 and 6 by bolts 7 and nuts 8. These bolts are of the inexpensive common stove bolt variety. As shown, the bolt head is provided with the usual slot for the reception of a screw driver blade. Medially dividing the casing thus formed, and retained in place by the flanges 5 and 6, is the leather diaphragm 9 which may be formed of oiled sheepskin or any other suitable material. The diaphragm 9 is secured in place by diaphragm pan 10, formed of tin or other light metal with an upturned edge portion 11. On the upper side of diaphragm 10 a lead weight 12 is disposed having a circular recess 13. The diaphragm 9 is held between weight 12 and pan 10, and the assembly is treated with any well known sealing compound in order to render the construction gas-tight and prevent the escape of gas through the diaphragm edge portions. Rigidly secured to weight 12 is nut 14, one easy way of securing the nut in place being to set it into the soft lead when the lead weight is cast. Threaded through nut 14 is screw 15 forming the valve stem provided at its lower end with a headed member 16, forming the regulator valve. Threaded on stem 15 is a lock nut 17 which bears against diaphragm pan 10 when the regulator is assembled. The head 16 is provided with a slot 18 adapted to receive a screw driver blade to hold the valve for assembly purposes.

The lower portion or body of the pressure regulator is formed from a single integral steel block 19, which is machined out of a piece of cold rolled steel stock. This single block is drilled or bored and machined to form the gas entry, gas outlet, valve seat, and to provide a hole for the reception of a closure plug and regulator support, all formed in the single integral piece of steel. 20 and 21 are respectively inlet and exit openings, tapped internally to provide a socket for the reception of the gas pipe connecting the regulator with the gas main and with the refrigerator. At the lower part of the block member 19 is formed a screw threaded hole for the reception of plug 22 which is readily removable. Formed in the end of plug 22 is a depression 23 for the reception of a tool (not shown) so that the plug 22 may be screwed into or out of the socket. Bored in the steel block is a bleed hole or gas outlet 24 connecting the diaphragm chamber with the outlet 21, and through which the gas leaves the regulator and the bleed hole is bored at an angle so as to reduce as much as possible pressure loss due to the passage of the gas through a tortuous opening. The upper part of central block 19 is bored and machined to provide a tapered valve seat 25 for seating valve 16 and to establish communication between inlet passage 20 and the lower part of the diaphragm chamber. A small vent hole 27 formed in upper casing section 3 establishes atmospheric pressure in the upper part of the diaphragm chamber.

In the modification of the upper pressed steel casing member shown in Figure 3 a pipe nipple 30 is welded to the casing member 3, the weld being shown at 31. This construction is used when it is desired to connect vent piping to the chamber formed by the casing 3 and diaphragm 9 in order to carry away any diaphragm leakage to some outside point.

Also as shown in Figure 3, a spring loaded diaphragm may be substituted for the weight loaded diaphragm of Figure 1, by substituting for weight 12, a diaphragm disc 32' held in position by nut 33, and providing the upper end of valve stem 15 with a spring engaging projection 34. Projection 34 projects through a perforation formed adjacent the free end of diaphragm loading spring 35, the other end of which is welded at 36 to upper casing section 3. The pressure of spring 35 of valve stem 15 is adjustable by adjusting the position of machine screw 37. Machine screw 37 is screwed in a tapped hole formed in projection 38 as indicated by a stamping operation. Screw 38 is locked in adjusted position by means of lock nut 39, and the inner end thereof engages spring 35. In this way it will be seen that a low cost spring operated adjustable regulator may be provided.

Sticker 32 supplied for the regulator and put on at the factory, forms a combined trade-mark, instruction card, indicator for direction of fluid flow, and label giving the outlet pressure for which the regulator is set. As shown the sticker has an arrow formed thereon, one end indicating the fluid inlet and one end indicating the fluid outlet, and each appropriately marked. As shown this sticker label 32 also indicates the side to be installed uppermost and the outlet pressure for which the regulator is designed. Other suitable information such as the manufacturer's name, patent numbers and the like may be supplied. In addition shipping instructions may be applied thereto, thereby eliminating the cost of applying a separate shipping tag. This renders the correct installation of the device an easy matter and the possibility of not using the right regulator for the particular service required is reduced to a minimum. In addition the cost of embossing or stamping the necessary information for proper installation and use on the pressed steel casing is eliminated, thereby permitting production and distribution of the regulator at low cost.

In operation the gas comes in at inlet 20, passes up through valve opening 25 into the chamber 26, and from there it passes out through bleed hole 24 and exit 21. Due to weight 12 valve stem 15 is pressed downward and there is a tendency for valve 16 to be held open. As the gas enters chamber 26 through valve aperture 25 under pressure it presses against diaphragm 9 and tends to raise weight 12, and thereby partially close valve 16. It will be seen that there will be maintained a set of equilibrium of forces in the diaphragm chamber, the downward force consisting of the weight, diaphragm parts, and valve parts, the upward force consisting of the pressure over the diaphragm area. If, for any reason such as an increase in the pressure entering at 20 or a decrease in the gas required in the outlet, the pressure in the diaphragm chamber tends to build up, the equilibrium of forces is disturbed, the entire diaphragm system is raised until the flow through aperture 25 is limited to such an extent that the equilibrium is again restored. Conversely a pressure decrease at the inlet side or increased demand for gas reduces the pressure in the diaphragm chamber, disturbs the force equilibrium and will open the valve until a sufficient rate of flow of gas is established that will again balance the forces.

It will be noted that the construction is extremely durable and sturdy, only the pressed steel casing and the solid steel block being subject to external deterioration or damage, and these parts are, of course, of solid unyielding construction. The mechanism is simple, possesses no moving parts and is very easily constructed and assembled. The parts are of relatively inexpensive construction and easily fabricated by the ordinary and usual machine tools. The only tools necessary to disassemble are a screw driver and wrench and it will be noted that when plug 22 is removed, easy access is gained to the valve 16 and valve stem 15. This ease of disassembly is an important and novel feature of my invention. It will also be noted that diaphragm 9 is securely held in a gas-tight condition, and that by reason of bent over flange 11 on diaphragm pan 10, the diaphragm will not scrape against a sharp edge, since flange 11 presents a smooth rounded surface. Thus there will be no tendency for the diaphragm to cut or tear. Plug 22 besides forming an element easily removable to gain entry to the regulator interior, is also adapted to serve as a support, should it be desirable to seat the regulator at its lowermost portion in a seat or support. The valve is supported in a vertical position and opens upwardly, and in this way advantage can be taken of such a simple regulating element as the vertically acting weight.

The construction is such that all the large parts of the regulator are formed from pressed steel, and the small parts in which machine work can be concentrated are made from cold rolled steel. This gives the resulting advantages of increased lightness, cheapness, and the avoidance of the possibility of porous castings, since castings which are cast in long thin sections are often porous and not gas-tight. Since cold rolled steel is used for the main body member this danger of gas leakage through porosity of the metal is entirely eliminated. The larger parts being formed by a simple pressing operation are constructed cheaply and the pressing operation renders these parts impervious. The machining which is only necessary on the smaller parts can be readily and inexpensively done because of their small size of the part and the size of the machine tools necessary for the operation may be appreciably reduced.

It will be noted that the top and bottom diaphragm case members 3 and 4 are identical except for the hole punched in each casing member. In this way they are pressed or formed on the same forming dies and the hole in each is punched out last. The hole in the top disc 3 is punched out for breathing purposes and the larger aperture in the lower disc is punched out for the reception of the projection 28 as described below. This is an important feature of the invention since the use of the same forming dies for both top and bottom diaphragm cases allows a substantial saving in the cost of this forming operation. The only change necessary in order to complete the construction of the cases is the change in the punch, and this change is simply and easily made. In addition the number and variety of die elements necessary is appreciably reduced with a consequent saving in the cost of these forming parts.

It will be apparent to those skilled in the art that wide variations may be made in the preferred embodiment herein described without departing from the spirit of the invention as defined by the scope of the appended claims, which are intended to include all true equivalents of this construction.

Accordingly, what is desired to be secured by Letters Patent and what is claimed as new is:

1. In combination with a sheet metal fluid pressure regulator casing having an apertured face, a machined steel block having a face designed for coaction with said casing face, a boss provided on said block and disposed in said coacting face, said block also being provided with suitable inlet and outlet ports and interconnecting ports extending through said boss, said block and casing being welded together in sealing relation with said boss extended through said casing aperture and with said coacting faces in contact, whereby said steel block will stiffen and maintain said casing against flexure or distortion.

2. In combination with a sheet metal fluid pressure regulator casing having an apertured face; a block having a face designed for coaction with said casing face; a boss provided on said block and disposed in said coacting face; said block having an inlet port and a fluid conduit communicating with said casing aperture and said inlet port, and having formed therein an outlet port and a second fluid conduit communicating with said outlet port and said aperture; said block and said casing being welded together in sealing relation with said boss extended through said casing aperture and with said coacting faces in contact, whereby said block will stiffen and maintain said casing against flexure or distortion.

3. In combination with a sheet metal fluid pressure regulator casing having an apertured face; a block having a face designed for coaction with said casing face; a boss provided on said block and disposed in said coacting face; said block having an inlet port and a fluid conduit communicating with said aperture and said inlet port, and having formed therein an outlet port and a second fluid conduit communicating with said outlet port and said aperture; said first mentioned conduit being provided with a valve seat and a valve disposed in said conduit and cooperating with said seat; said block and casing being welded together in sealing relation with said boss extended through said casing aperture and with said coacting faces in contact, whereby said steel block will stiffen and maintain said casing against flexure or distortion.

ALLEN D. MacLEAN.